United States Patent [19]

Branecky

[11] 3,916,695

[45] Nov. 4, 1975

[54] METHOD OF WEIGHING PIECES OF MAIL

[75] Inventor: George N. Branecky, Bethel, Conn.

[73] Assignee: Pitney-Bowes, Inc., Stamford, Conn.

[22] Filed: May 6, 1974

[21] Appl. No.: 466,971

[52] U.S. Cl. .............................. 73/432 R; 198/39
[51] Int. Cl.$^2$ ......................................... G01G 13/00
[58] Field of Search ..... 73/432 R; 198/39; 177/210; 33/1 V, 14 L

[56] References Cited
UNITED STATES PATENTS

| | | | |
|---|---|---|---|
| 2,630,043 | 3/1953 | Kolisch | 73/432 R |
| 2,708,368 | 5/1955 | Kolisch | 73/432 R |
| 2,904,163 | 9/1959 | Golding et al. | 198/39 |

FOREIGN PATENTS OR APPLICATIONS

| | | | |
|---|---|---|---|
| 983,334 | 2/1955 | United Kingdom | 198/39 |

Primary Examiner—James J. Gill
Assistant Examiner—Anthony V. Ciarlante
Attorney, Agent, or Firm—William D. Soltow, Jr.; Albert W. Scribner; Robert S. Salzman

[57] ABSTRACT

A method of determining the weight of a lettered piece of mail without having to weigh the letter. A plurality of thickness measurements are made at spaced-apart intervals over the face of the envelope. Each thickness measurement corresponds to a thickness-unit area value for a segment of the letter. The thickness-area measurements are summed, and the sum is multiplied by a density coefficient. The density coefficient corresponds to the weight of paper per unit thickness and unit area. The product of the multiplication is the weight for the measured piece of mail.

8 Claims, 5 Drawing Figures

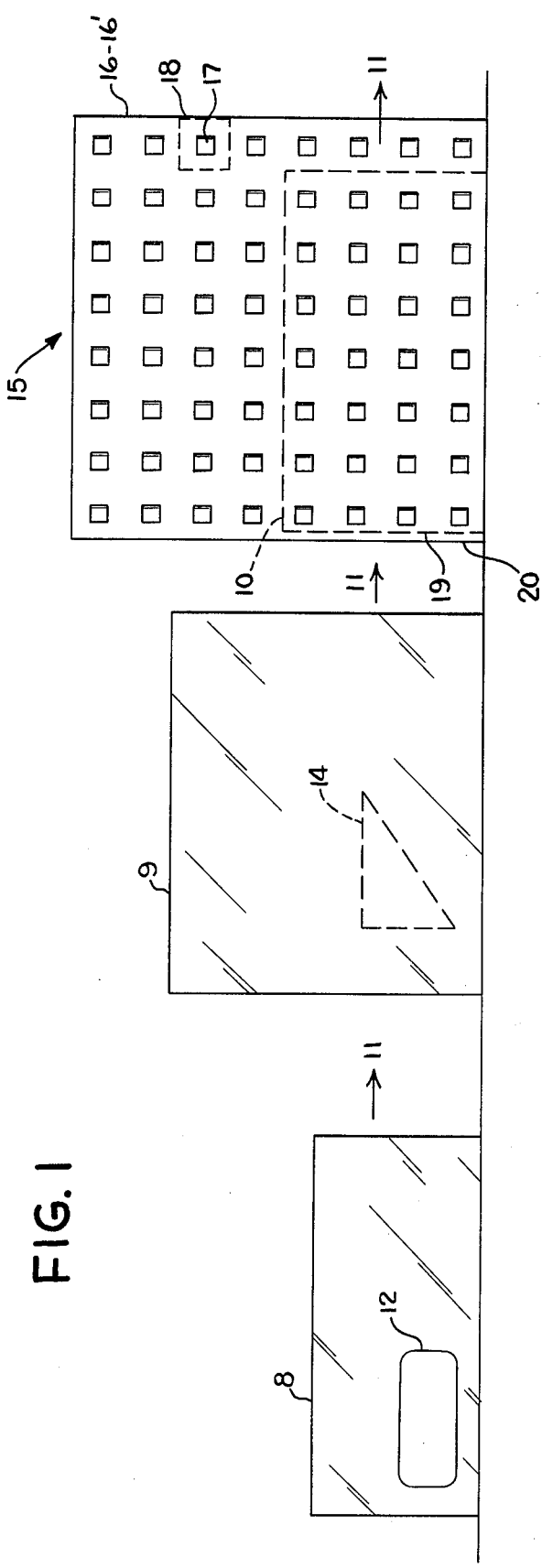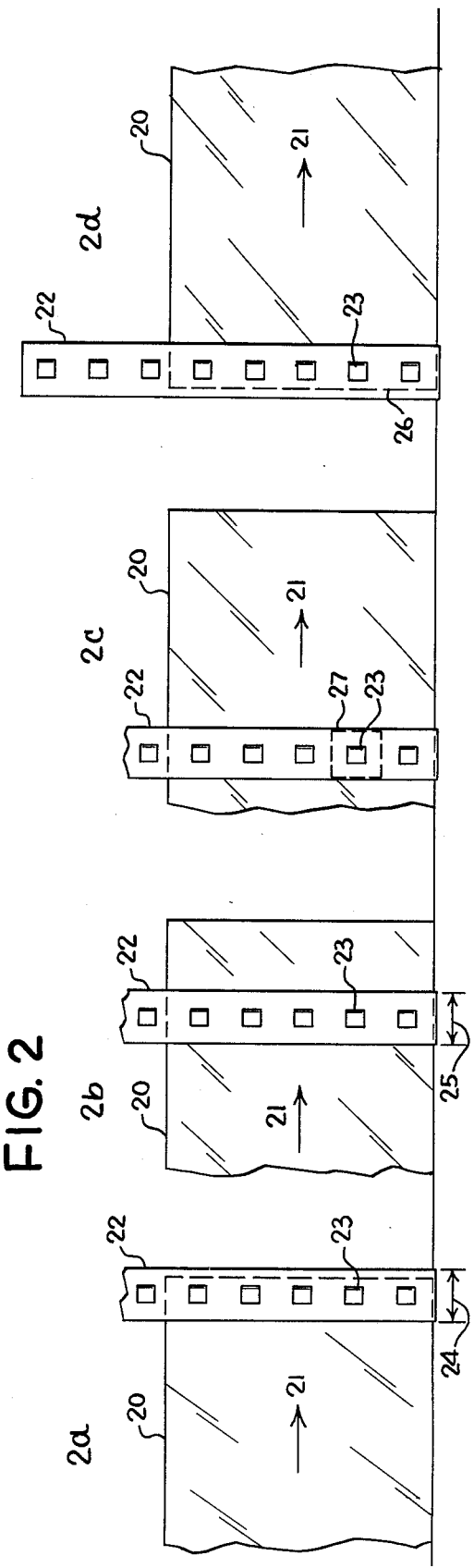

METHOD OF WEIGHING PIECES OF MAIL

The invention pertains to methods of determining weight of pieces of mail, and more particularly to a method of obtaining the weight of a letter without having to make an actual weight measurement.

BACKGROUND OF THE INVENTION

Modern day business needs are creating a demand for higher speed mailing machines. As greater mail handling speeds are required, traditional methods of weighing, sorting, and imprinting postage upon mail are becoming obsolete.

Weighing pieces of mail has been traditionally one of the slower operations in the mail handling art. While it is often possible to imprint postage or sort letters in fractions of a second, the weighing of envelopes by means of a weighing scale often takes longer. This is a result of having to wait until the scale damps out, before a reading can be accurately taken. In addition, the letter often cannot be weighed "on-the-fly" (while moving) using a weighing scale apparatus.

The present invention provides a new method of weighing mail, which will greatly speed the weighing process, and which provides for weighing on-the-fly.

PRIOR ART

Heretofore, it has been known that the average thickness of a sheet of material of standard size (assuming a fairly uniform size and thickness) could be obtained by weighing the sheet article. Such a teaching is given in the patent to: K. E. Golding, U.S. Pat. No. 2,904,163, issued on Sept. 15, 1959.

Other prior art systems show that it is fairly common to determine the volume, area, and/or dimensions of an article by photocells, sensors, and timing devices: E. Kolisch, U.S. Pat. Nos. 2,630,043; J. C. Denman, Jr. et al, 2,860,420; F. C. Rock, Jr., 3,480,141; J. F. Flodin, 3,603,457; T. Akuta et al, 3,621,266; F. J. Perkins, 790,917; and J. J. Gotz, 931,552.

None of the above patents, however, disclose a method of determining the weight of varying sizes of articles (mail or otherwise) by making dimensional measurements of the article.

In addition, nowhere in the prior art is it suggested how the volume of an article may be determined without measuring the length and width of the object, as is taught by the present inventive method.

SUMMARY OF THE INVENTION

The weight determining method of this invention contemplates positioning a grid or column of sensors along a mail handling feed path. As the envelope passes contiguously of the sensors, a plurality of thickness measurements are made across the surface area of the letter. Each sensed point upon the piece of mail provides a thickness value for a unit area, e.g., several thousandths of an inch in thickness per square inch of envelope surface.

By a method similar to integration, all the thickness readings for each segment of the envelope surface are summed to provide a volume indication for the entire letter, e.g, a totalized thickness - area value for the envelope.

Naturally, if a letter is larger in width, length, or thickness, the totalized volume value will be greater, and if the envelope is dimensionally smaller, the totalized volume value will be less.

The summed thickness-area measurements are then multiplied by a density coefficient corresponding to the weight of paper per unit thickness and unit area. The product of this multiplication is the weight for the measured piece of mail.

It is an object of this invention to provide an improved method of determining the weight of a piece of mail;

It is another object of the invention to provide a method for weighing a piece of mail on-the-fly;

It is still another object of this invention to provide a weighing method for a piece of mail which is faster than conventional weighing methods.

These and other objects of the invention will become more apparent and will be better understood with reference to the following detail description taken in conjunction with the accompanying drawings, in which:

FIG. 1 is a front view of a plurality of different sized letters moving in seriatim along a feed path in a mail handling system comprising a thickness sensing grid in accordance with the method of this invention; and FIGS. 2a through 2d are sequential front views of a letter moving past a column of thickness sensors in accordance with the method of this invention.

DETAILED DESCRIPTION

Generally speaking, the invention is for a method of determining the weight of a lettered piece of mail by making physical measurements of the letter. A plurality of thickness measurements are made at given spaced-apart locations substantially about an entire surface area of the letter. Each of these spaced-apart measurements correspond to a thickness-unit area value for a segment of the letter. The thickness measurements are summed to provide a totalized thickness-area value for the piece of mail. This totalized thickness-area value is then multiplied by a density coefficient corresponding to the weight of paper-like material per unit thickness and unit area. The weight of the piece of mail is the product of this multiplication.

Now referring to FIG. 1, a plurality of different sized envelopes 8, 9, and 10, respectively, are shown moving in seriatim along a feed path of a mail handling system (arrows 11). Letter 8 has a see-through window 12; letter 9 contains an irregular shaped enclosure 14; and envelope 10 contains a standard letter enclosure (not shown).

As the envelopes move along the feed path, they pass through a thickness sensing station, generally shown by arrow 15. Letter 10 is shown passing through station 15. The thickness sensing station 15 comprises two oppositely adjacent plates 16 and $16^1$ through which the envelopes pass (plate $16^1$ is directly behind plate 16). Each of the plates 16 and $16^1$ contain a grid of spring-loaded rollers 17 (typical), which are spaced a given distance apart from each other upon plates 16 and $16^1$, such that each roller position corresponds to a unitized segment 18 upon plates 16 and 16. This segment 18 has been arbitrarily picked for the purposes of description to represent one square inch of surface area.

Each roller 17 on plate 16 is adjacent a roller 17 on adjacent plate $16^1$. An envelope passing between plates 16 and $16^1$, is forced between a plurality of roller pairs, such that each different sized envelope 8, 9, or 10, respectively, will pass between a different grid size of roller pairs.

Each pair of rollers is connected to an individual thickness sensing apparatus. Each roller pair will provide a thickness measurement over a unitized segment 18 on the face of the envelope. Thus, the entire face of an envelope will be measured.

The readings provided by the individual roller pairs are taken simultaneously as the trailing edge 19 of the envelope passes the leading edge 20 of plate 16. Thus, the instantaneous thickness readings are provided while the envelope is still moving. These on-the-fly readings are then sent to an electronic adder (not shown), which sums the thickness readings to produce a totalized thickness-area value for that particular sized envelope. It will be seen that for various sized envelopes, this totalized value will change because different numbers of roller pairs will be operative. It will also be seen that differnt envelope thicknesses, including variations across the entire face of the letter, will influence this totalized value as well.

It should be apparent, that the volumes of different sized letters are provided by the above technique, and that the totalized-thickness area value is in reality the volume measurement for a particular envelope.

Once the volume of a piece of mail is determined, this value is multiplied by the density for letter-type paper. This multiplication will most probably be obtained by electronic means to provide an instantaneous weight reading:

$$\text{Weight} = \text{Volume} \times \text{Density}$$
$$= \text{Volume} \times \frac{(\text{Weight})}{(\text{volume})}$$

The readings of rollers 17 can be taken simultaneously and instantaneously by providing a trailing edge sensing photodetector (not shown) at plate edge 20. This photodetector will activate the initiation of thickness measurements when the trailing edge 19 of the envelope moves past the leading edge 20 of plate 16.

The weight of envelopes such as envelopes 8 and 9 with a glassine window 12, and containing irregular inserts 14, respectively, appear to be determined equally well by the above inventive method. The letter density factor appears to work equally well for almost all types of paper. Naturally, if there is a metallic insert within an envelope, the aforementioned method will probably not be accurate within the required postage determining tolerances of "plus or minus" 15 grains. It should be noted, however, that the above method will be accurate for most mail passing through the system, since most letters contain only paper inserts, albeit of different thicknesses, shapes, sizes, and densities.

The following example is the weight determination for an envelope measuring approximately 8 inches × 4 inches and having a glassine window of approximately 4 inches × 1 inches:

EXAMPLE I

The envelope has 32 sampled points. Each point was measured for the exact thickness:

| Points | | | |
|---|---|---|---|
| No. 1 = .015 inches thick | | 17 = .010 inches thick | |
| 2 = .010 | " | 18 = .006 | " |
| 3 = .010 | " | 19 = .015 | " |
| 4 = .015 | " | 20 = .010 | " |
| 5 = .010 | " | 21 = .010 | " |
| 6 = .011 | " | 22 = .011 | " |
| 7 = .010 | " | 23 = .020 | " |
| 8 = .015 | " | 24 = .010 | " |
| 9 = .010 | " | 25 = .010 | " |
| 10 = .006 | " | 26 = .015 | " |
| 11 = .020 | " | 27 = .010 | " |
| 12 = .010 | " | 28 = .015 | " |
| 13 = .010 | " | 29 = .015 | " |
| 14 = .006 | " | 30 = .010 | " |
| 15 = .015 | " | 31 = .010 | " |
| 16 = .010 | " | 32 = .015 | " |

The total of the 32 points sampled is 0.375 of an inch.

If the known weight of a square inch of paper 0.001 of an inch thick is 0.1745 grains (density coefficient), then the total weight of the envelope would be 65.4375 grains.

| Known weight 1 square inch of paper | × | Total thickness of points sampled in thousands | = | Total weight in grains |
|---|---|---|---|---|
| .1745 | × | 375 | = | 65.4375 |

The exact weight of the envelope sampled was 65.625 grains.

The following example is the weight determination for a standard envelope measuring approximately 9-½ inches × 4-¼ inches:

EXAMPLE II

The envelope has 36 sampled points. Each point was measured for the exact thickness:

| Points | | | |
|---|---|---|---|
| No. 1 = .016 inches thick | | 19 = 16 inches thick | |
| 2 = 11 | " | 20 = 11 | " |
| 3 = 11 | " | 21 = 11 | " |
| 4 = 16 | " | 22 = 11 | " |
| 5 = 11 | " | 23 = 16 | " |
| 6 = 16 | " | 24 = 11 | " |
| 7 = 11 | " | 25 = 11 | " |
| 8 = 16 | " | 26 = 16 | " |
| 9 = 11 | " | 27 = 11 | " |
| 10 = 11 | " | 28 = 16 | " |
| 11 = 16 | " | 29 = 11 | " |
| 12 = 16 | " | 30 = 16 | " |
| 13 = 11 | " | 31 = 11 | " |
| 14 = 11 | " | 32 = 16 | " |
| 15 = 16 | " | 33 = 16 | " |
| 16 = 11 | " | 34 = 11 | " |
| 17 = 11 | " | 35 = 11 | " |
| 18 = 11 | " | 36 = 16 | " |

The total of the 36 points sampled is 0.471 of an inch.

If the known weight of a square inch of paper 0.001 of an inch thick is 0.1745 grains (density coefficient), then the total weight of the envelope would be 82.1895 grains.

| Known weight of 1 square inch of paper | X | Total thickness of points sampled in thousands | = | Total weight in grains |
|---|---|---|---|---|
| .1745 | X | 471 | = | 82.1895 |

The exact weight of the envelope was 82.0 grains.

As can be seen from the foregoing examples, the inventive method is exceptionally accurate for different types of envelopes. Tests run for different densities of paper were of similar accuracy using the paper density coefficient of 0.1745 grains per square inch of area and 0.001 inches in thickness. The density coefficient necessary to give fairly good results would appear to lie within the range between 0.1735 and 0.1810.

When an envelope contains a conventional tab card (computer record card) as used in billing, a density coefficient of 0.18 will give more accurate results. This can be seen from the following example:

EXAMPLE III

|  | Tab Card |  | Envelope (Example II) |  | Total |
|---|---|---|---|---|---|
| Calculated Weight (using a density co-efficient = 0.18) | 30.24 | + | 84.78 | = | 115.02 |
| Actual Weight | 36.40 | + | 82.00 | = | 118.40 |

It can be seen from the foregoing example, that although a higher density coefficient will increase the calculated weight of an envelope, the envelope weight still remains in tolerance and the overall calculated weight of the envelope and tab card is more accurate.

Thus, the coefficient of 0.18 can also be used with good results with envelopes which do not contain a tab card.

An alternate way of practicing the invention can be seen with reference to FIGS. 2a through 2d. An envelope 20 is shown moving along a feed path (arrows 21), past a column 22 of roller pairs 23 (typical). The roller pairs 23 are similarly arranged as the rollers 17 of FIG. 1. The envelope 20 is indexed past the column 22 of roller sensors 23, such that in FIG. 2a the leading edge portion 24 of the envelope is measured. The envelope is indexed a given distance each time, such that in FIG. 2b, the column area 25 treated is for example, one inch past area 24 of FIG. 2a. The envelope 20 continues to be indexed through one inch column increments (FIG. 2c) until such time as the trailing edge 26 runs past the sensor column 22 (FIG. 2d). Each time the envelope is indexed, the new thickness readings are added to the other thickness readings. When the envelope 20 moves past sensor column 22, the entire surface of the envelope has been tested, and a volume determination has been obtained. The method of indexing the letters past a column 22 of sensors 23 has the advantage that less sensors may be used, but has the disadvantage that the time necessary for testing is increased. The totalized thickness-area value is again multiplied by a density co-efficient similarly as in FIG. 1, to provide a weight determination. Column 22 is made high enough to receive all letter heights. Those sensors 23 not reached by a smaller envelope will naturally register a zero reading. The sensors 23 are spaced-apart along the vertical a given distance to provide a reading for a standard segment 27 of envelope (FIG. 2c), similar to segment 18 of FIG. 1.

Naturally, other means for measuring thickness segments of the envelope may be employed, such as using spring-loaded spheres or balls instead of rollers 17. Means for electrically amplifying the thickness signals provided by rollers 17 may be required for very fine measurements.

The inventive method is not to be limited by any change in apparatus needed to practice the method.

The attached drawings are deemed to be merely exemplary, and are presented only as a means of providing an understanding of possible ways of practicing the inventive method.

The spirit and scope of the invention is considered defined by the appended claims.

What is claimed is:

1. A method of determining the weight of a lettered piece of mail by making physical measurements of the letter, the method comprising the steps of:
    a. making a plurality of thickness measurements at given spaced-apart locations substantially about an entire surface area of a letter, each of said spaced-apart thickness measurements corresponding to a thickness-unit area value for a segment of said letter;
    b. summing the thickness measurements to provide a totalized thickness-area value for said letter; and
    c. multiplying said totalized thickness-area value by a density co-efficient, said density coefficient corresponding to the weight of paper-like material per unit thickness and unit area, the weight of said piece of mail being a product of the multiplication.

2. The method of claim 1, wherein said density coefficient has a value range between 0.1735 and 0.181 grains per square inch, and 0.001 inches in thickness.

3. The method of claim 1, wherein said density coefficient has a value of 0.1745 grains per square inch, and 0.001 inches in thickness.

4. The method of claim 1, wherein said density coefficient has a value of approximately 0.18 grains per square inch, and 0.001 inches in thickness.

5. A method of determining the weight of a lettered piece of mail being fed through a mail handling system, comprising the steps of:
    a. transporting a lettered piece of mail through a mail handling system;
    b. making a plurality of thickness measurements at given spaced-apart intervals substantially about an entire surface area of the letter as said letter moves through the mail handling system, each of said spaced-apart thickness measurements corresponding to a thickness-unit area value for a segment of said letter;
    c. summing the thickness measurements to provide a totalized thickness-area value for said letter; and
    d. multiplying said totalized thickness-area value by a density coefficient, said density coefficient corresponding to the weight of paper-like material per unit thickness and unit area, the weight of said piece of mail being a product of the multiplication.

6. The method of claim 5, wherein said density coefficient has a value range between 0.1735 and 0.181 grains per square inch, and 0.001 inches in thickness.

7. The method of claim 5, wherein said density coefficient has a value of 0.1745 grains per square inch, and 0.001 inches in thickness.

8. The method of claim 5, wherein said density coefficient has a value of 0.18 grains per square inch, and 0.001 inches in thickness.

* * * * *